United States Patent
Froemming et al.

(10) Patent No.: US 10,718,229 B2
(45) Date of Patent: Jul. 21, 2020

(54) INFRARED SUPPRESSION SYSTEM IN A GAS TURBINE ENGINE

(71) Applicant: Rolls-Royce North American Technologies, Inc., Indianapolis, IN (US)

(72) Inventors: Kenneth William Froemming, Carmel, IN (US); Kenneth M. Pesyna, Carmel, IN (US)

(73) Assignee: ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 1050 days.

(21) Appl. No.: 15/216,365

(22) Filed: Jul. 21, 2016

(65) Prior Publication Data

US 2018/0023411 A1  Jan. 25, 2018

(51) Int. Cl.
*F02K 1/82* (2006.01)
*F01D 17/16* (2006.01)
*F02K 1/36* (2006.01)

(52) U.S. Cl.
CPC ......... *F01D 17/162* (2013.01); *F01D 17/167* (2013.01); *F02K 1/36* (2013.01); *F02K 1/82* (2013.01); *F02K 1/825* (2013.01)

(58) Field of Classification Search
CPC ...... F01D 5/147; F01D 17/162; F01D 17/167; F01D 60/77; F02K 1/36; F02K 1/82; F02K 1/825
USPC .............................................. 60/770; 415/211
See application file for complete search history.

(56) References Cited

U.S. PATENT DOCUMENTS

| | | | | |
|---|---|---|---|---|
| 3,563,669 A * | 2/1971 | Hockert | .................. | F01D 5/148 415/115 |
| 4,007,587 A * | 2/1977 | Banthin | .................. | F01D 5/148 415/115 |
| 4,095,417 A * | 6/1978 | Banthin | .................. | F02K 1/825 239/127.3 |
| 4,994,660 A * | 2/1991 | Hauer | ..................... | F01D 5/148 415/115 |
| 5,233,827 A * | 8/1993 | Johnson | .................. | F02K 1/825 60/226.1 |
| 8,690,520 B2 * | 4/2014 | Colotte | ................... | F01D 17/16 415/149.4 |
| 2010/0086401 A1 * | 4/2010 | Davey | ..................... | F01D 9/042 415/209.3 |
| 2010/0146980 A1 * | 6/2010 | Strom | ..................... | F02K 1/825 60/770 |
| 2015/0000268 A1 * | 1/2015 | Clancy | .................... | F02B 37/24 60/598 |
| 2015/0129676 A1 * | 5/2015 | Pesyna | .................. | F02K 1/1207 239/11 |

* cited by examiner

Primary Examiner — Steven M Sutherland
(74) *Attorney, Agent, or Firm* — McCracken & Gillen LLC

(57) ABSTRACT

According to one aspect, a system for alignment of vanes to suppress infrared detection in a gas turbine engine is provided. The system includes a first vane disposed on a first component, and a second vane disposed on a second component. The second vane is configured to engage the first vane such that the second component is capable of being positioned proximal to the first component.

17 Claims, 7 Drawing Sheets

INFRARED SUPPRESSION SYSTEM IN A GAS TURBINE ENGINE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to gas turbine engines, and more particularly, to infrared suppression systems for gas turbine engines.

BACKGROUND

Gas turbine engines comprise a number of components that are assembled in series and axially in relation to one another. One of the components in this assembly is an exhaust portion that directs a hot exhaust fluid out of the gas turbine engine. In the instances where the gas turbine engine is utilized in an aircraft, and more specifically a military aircraft, the hot exhaust fluid may be visible as a red glow from the aft position of the gas turbine engine nozzle portion. In other words, the red glow of the hot exhaust fluid of the engine passing through a turbine portion of the gas turbine engine can be seen by looking into the nozzle portion along a line-of-sight (LOS) aligned directly toward the exhaust portion and the turbine portion. The red glow generated by the combustion in the gas turbine engine has a temperature in the range of about 800 to about 1200 Fahrenheit. The visible red glow creates an infrared (IR) signature that can be detected by hostile heat-seeking missiles and can significantly elevate a threat level to safe operation of the aircraft. Traditionally, various techniques such as decoy flares have been used to thwart the infrared heat-seeking missiles from locking onto the IR signature of the aircraft. The decoy flares technique, however, requires continual use of flares and can be inefficient and in some instances ineffective. Thus, there is a need for another IR signature suppression system to more efficiently and effectively blunt an IR signature detection system of a heat-seeking missile in threat situations against the aircraft.

SUMMARY

According to one aspect, a system for alignment of vanes to suppress infrared detection in a gas turbine engine, which comprises a first vane disposed on a first component, and a second vane disposed on a second component, wherein the second vane is configured to engage the first vane such that the second component is capable of being positioned proximal to the first component.

According to another aspect, an infrared suppression system for a gas turbine engine, which comprises a first exhaust component having a first plurality of vanes, and a second exhaust component having a second plurality of vanes, wherein the second plurality of vanes is configured to engage the first plurality of vanes in a mating arrangement.

Other aspects and advantages will become apparent upon consideration of the following detailed description and the attached drawings wherein like numerals designate like structures throughout the specification.

DETAILED DESCRIPTION

As shown herein an infrared suppression system with a system for alignment of vanes to suppress IR detection is provided that utilizes corresponding sets of S-vanes and manipulates the configuration of the S-vanes to minimize or eliminate an IR signature produced in gas turbine engines. The IR suppression system is part of an exhaust portion of the gas turbine engine. When the IR suppression system is inactive, it enables a LOS view of a red glow of a hot exhaust fluid within a turbine portion by engaging the corresponding sets of S-vanes together and positioning the S-vanes in a retracted configuration. Conversely, when the IR suppression system is active, it substantially blocks a LOS view of the red glow by disengaging the corresponding sets of S-vanes away from each other and positioning the S-vanes in an extended configuration. When the red glow from within the turbine portion is visible along the LOS, then the gas turbine engine is operating in a performance mode and on the other hand when the LOS view is blocked and the red glow is not visible, then the gas turbine engine is operating in a less than optimum efficiency performance and is in an IR suppression mode.

Figure 1:
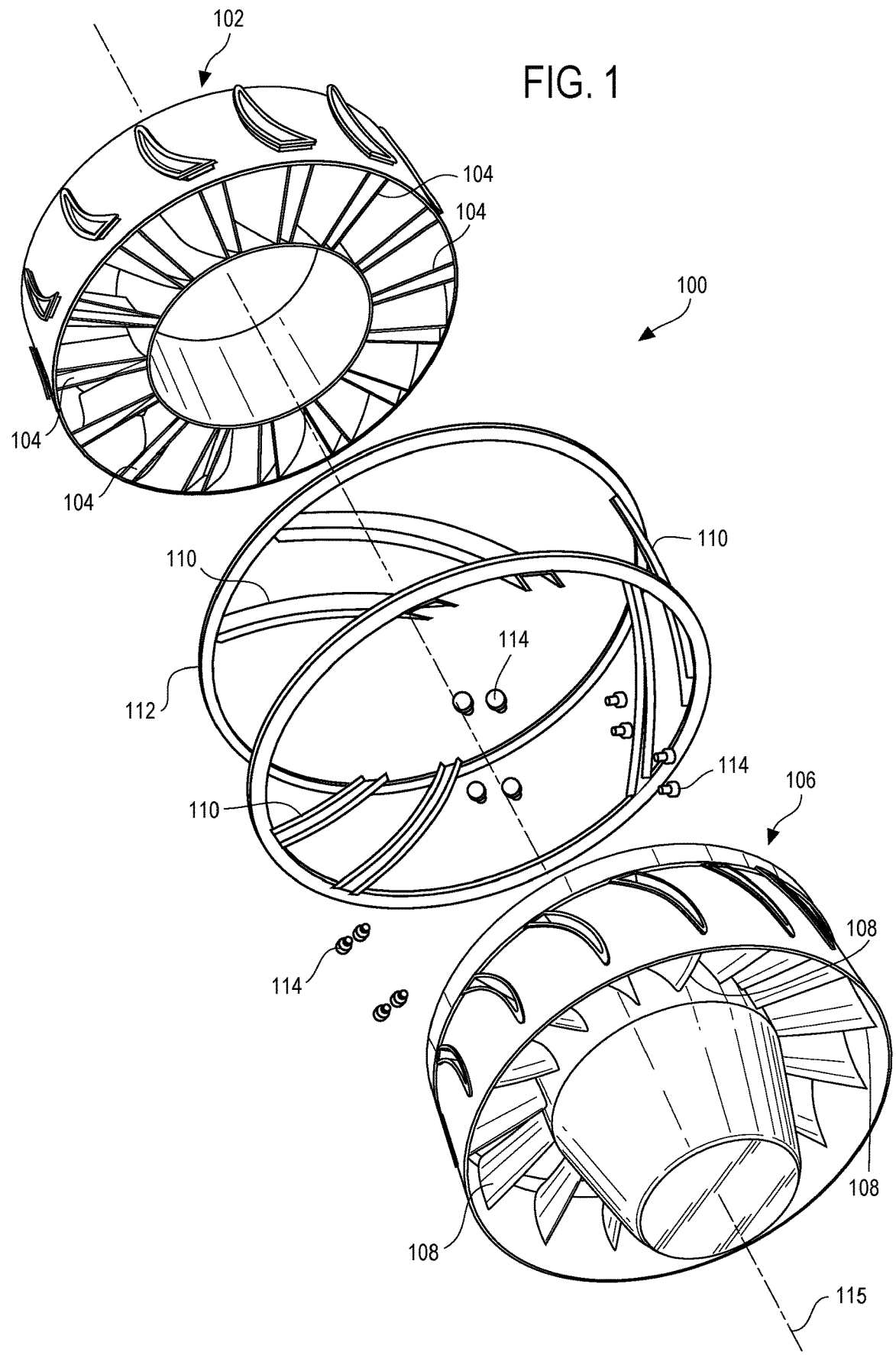
FIG. 1 is an exploded, isometric view of an embodiment of an infrared suppression system for a gas turbine engine.

FIG. 1 illustrates an exploded, isometric view of an embodiment of an infrared suppression system 100 for a gas turbine engine (not shown). A first exhaust component is part of a larger exhaust system (not shown) of the gas turbine engine. The first exhaust component may be stationary or movable. In an embodiment described herein, the first exhaust component may be, for example, a stationary blocker vane segment 102. The stationary blocker vane segment 102 includes stationary vanes 104 that are disposed as a vane pack in a circular fashion within the stationary blocker vane segment 102. A second exhaust component is also part of the exhaust system of the gas turbine engine. The second exhaust component may be stationary or movable. In the present embodiment, the second exhaust component may be, for example, a movable telescoping blocker vane segment 106. The telescoping blocker vane segment 106 includes movable vanes 108 that are disposed as another vane pack in a circular fashion within the telescoping blocker vane segment 106.

One or more guide tracks 110 may be secured between two-parallel-ring-shaped support structure 112. The support structure 112 is connected to the stationary blocker vane segment 102. One or more guide rollers 114 are secured to the telescoping blocker vane segment 106. Each guide roller 114 is associated with and disposed in a corresponding guide track 110. The guide rollers 114 facilitate the directional movement of the telescoping blocker vane segment 106 along a path of the guide tracks 110. One or more pairs of guide roller(s) 114 and its associated guide track(s) 110 may be disposed around the circumference of the IR suppression system 100. In the embodiment show in FIG. 1, for example, three pairs of guide rollers 114 and associated guide tracks 110 are disposed at about 120 degrees of separation around the circumference of the IR suppression system 100 to provide more stability and accuracy to the movement of the telescoping blocker vane segment 106 in relation to the stationary blocker vane segment 102. The telescoping blocker vane segment 106 may be mechanically articulated via an actuating mechanism (not shown) to move the telescoping blocker vane segment 106 toward or away from the stationary blocker vane segment 102 along a common central axis 115. In the instance when the telescoping blocker vane segment 106 is moved toward the stationary blocker vane segment 102, in addition to an axially forward motion, the telescoping blocker vane segment 106 is guided and rotated in a radial direction caused by the guide rollers 114. Because the guide rollers 114 are connected to the telescoping blocker vane segment 106 and are constrained by a radial guide path of the guide tracks 110, an additional radial motion component is imparted to the forward movement of the telescoping blocker vane segment 106. The combination of the axially forward movement and the radial motion result in an overall helical movement of the moveable vanes 108 as the telescoping blocker vane segment 106 reciprocates toward and away from the stationary blocker vane segment 102.

Figure 2:
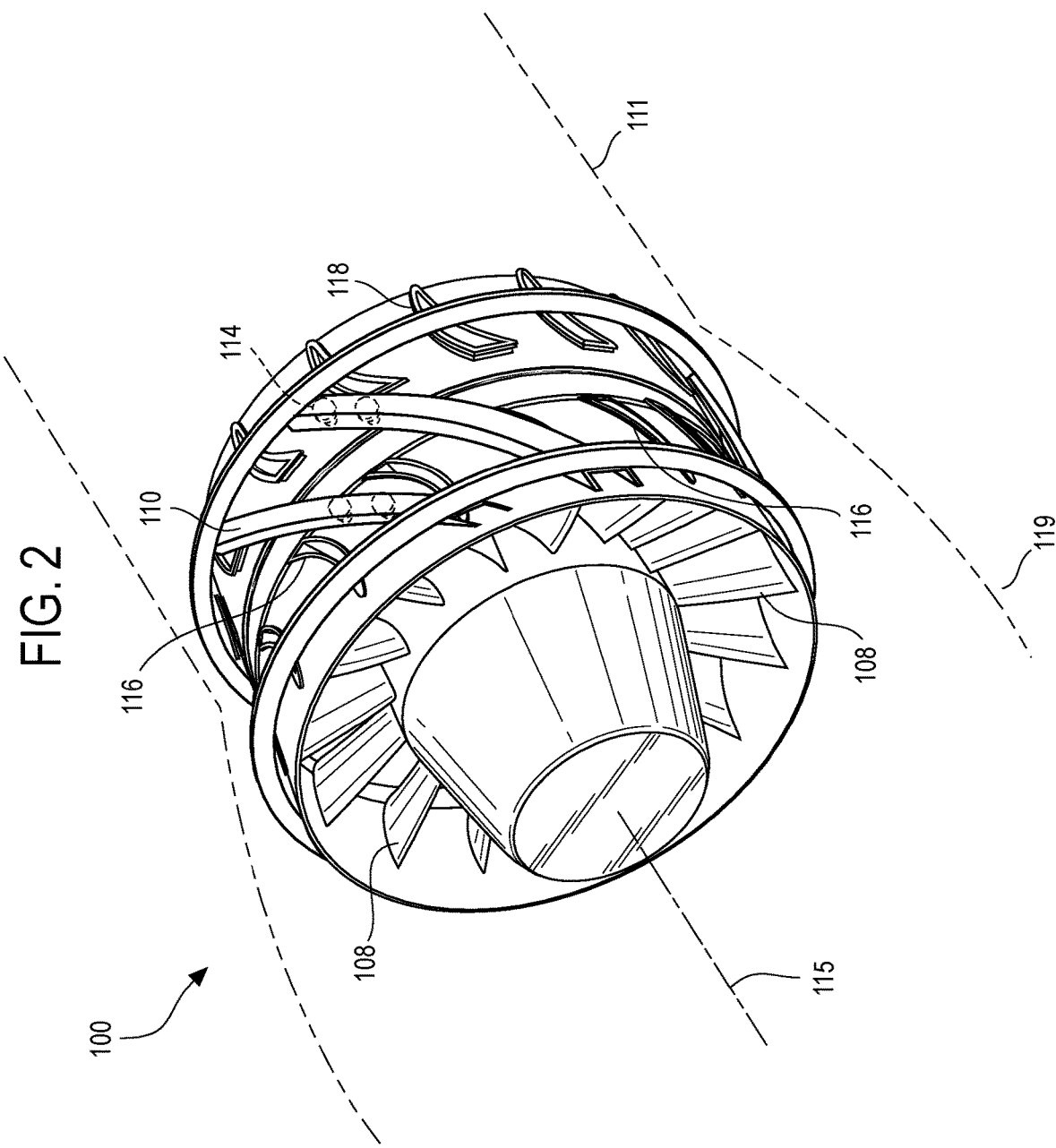
FIG. 2 is an isometric view of the embodiment of the assembled infrared suppression system of FIG. 1.
Figure 3:
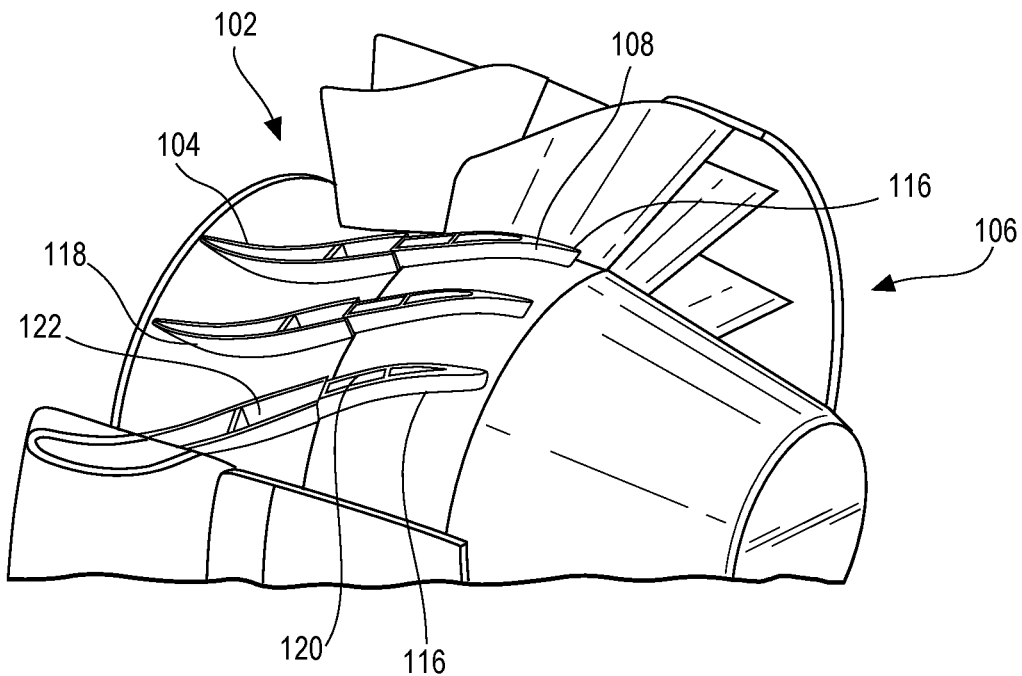
FIG. 3 is a fragmentary, partially cross sectional, isometric view of an embodiment of S-vanes in an extended configuration of the infrared suppression system of FIG. 2.

Referring to FIG. 2, an embodiment of the IR suppression system 100 is shown in an assembled configuration. The IR suppression system 100 is disposed downstream from a turbine portion 111 and is at least partially enclosed by a nozzle portion 119. Each movable vane 108 includes a moveable vane trailing edge 116 in a shape of a curved portion. Similarly, each stationary vane 104 includes a stationary vane trailing edge 118 in a shape of another curved portion. In operation, the telescoping blocker vane segment 106 may be either positioned proximal or distal to the stationary blocker vane segment 102 depending on whether the IR suppression system 100 is in the performance mode or the IR suppression mode. As shown in FIG. 3, when the telescoping blocker vane segment 106 is separated and disengaged from the stationary blocker vane segment 102, each stationary vane trailing edge 118 in cooperation with each moveable vane trailing edge 116 align in such a configuration that any openings along a LOS are minimized or eliminated. Hence, a view of the red glow along the LOS into the turbine portion is either partially or wholly blocked as described below in connection with FIG. 7. This alignment configuration of the stationary vane trailing edge 118 and the moveable vane trailing edge 116 results in the IR signature suppression of the red glow and inhibits a detection of the IR signature from the turbine portion of the gas turbine engine.

Figure 4:
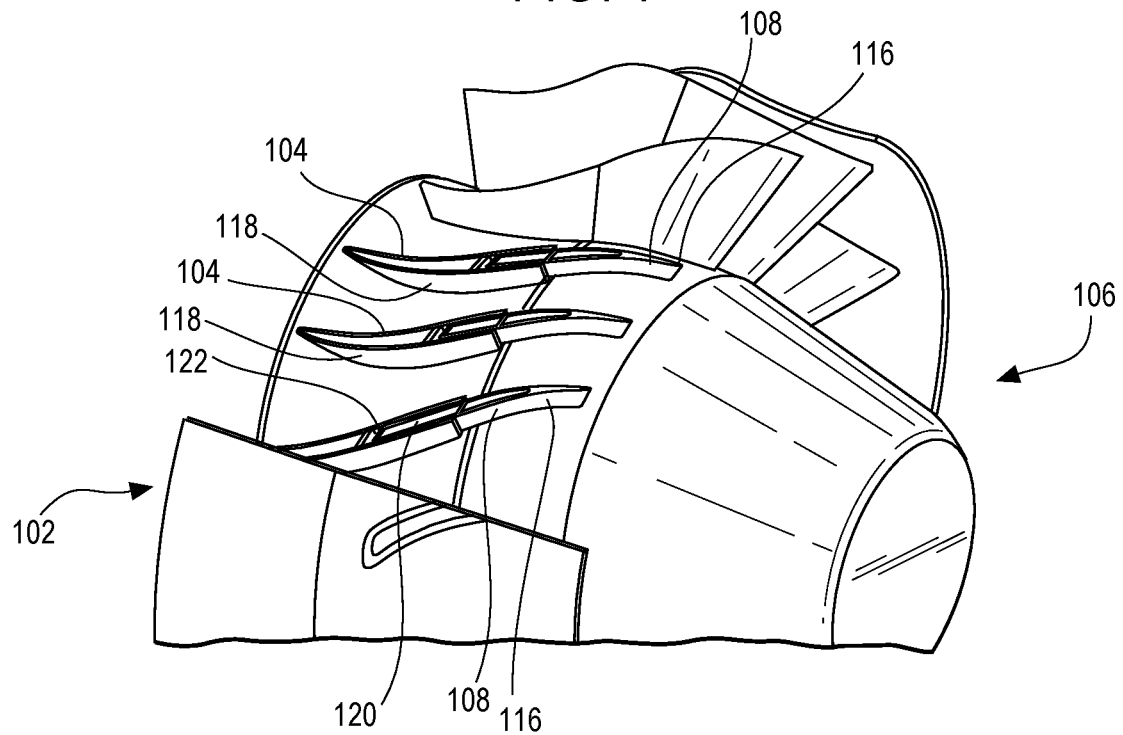
FIG. 4 is a fragmentary, partially cross sectional, isometric view of an embodiment of S-vanes in a retracted configuration of the infrared suppression system of FIG. 2.

Referring to FIG. 3, each movable vane 108 includes a transition portion 120 and each stationary vane 104 includes a stationary transition portion 122 that is associated and aligned with the transition portion 120 of each movable vane 108. The telescoping blocker vane segment 106 is shown in an extended position away from the stationary blocker vane segment 102. The stationary vane trailing edge 118 extends away from the stationary transition portion 122 in a first transverse direction, while the moveable vane trailing edge 116 extends away from transition portion 122 in a second transverse direction. With a helical twisting movement of telescoping blocker vane segment 106 toward the stationary blocker vane segment 102, each transition portion 120 engages and mates with a corresponding stationary transition portion 122 as shown in FIG. 4.

Figure 5:
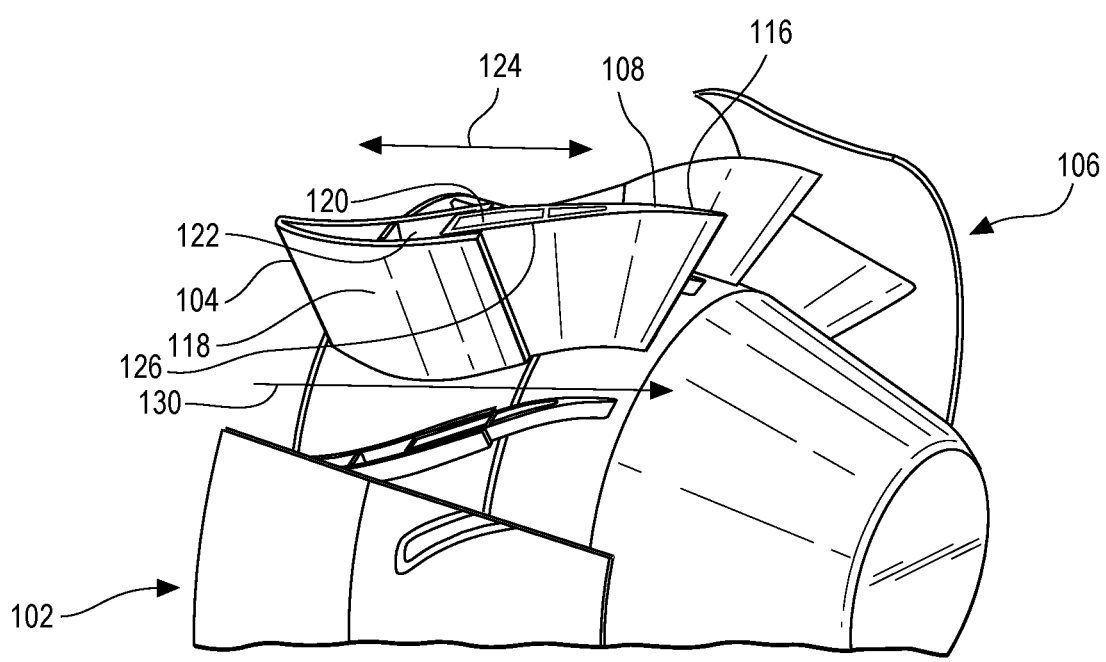
FIG. 5 is an enlarged, fragmentary, partially cross sectional, isometric view of an embodiment of an example of a pair of S-vanes of the infrared suppression system of FIG. 2 in a partially engaged arrangement.

Referring to FIG. 5, an enlarged view of an embodiment of an example of a pair of S-vanes is shown to further demonstrate the retraction and extension of the movable vanes 108 into and out of the stationary vanes 104. The reciprocating motion shown by the double-headed arrow 124 permits the transition portion 120 to twist in and out of the stationary transition portion 122. It should be noted that as the telescoping blocker vane segment 106 is retracted toward the stationary blocker vane segment 102, the performance of the gas turbine engine is increased and conversely, as the telescoping blocker vane segment 106 is extended away from the stationary blocker vane segment 102, the performance is reduced. The gas turbine engine operates in the IR suppression mode as the telescoping blocker vane segment 106 is substantially extended away from the stationary blocker vane segment 102. A width of the transition portion 120 is slightly smaller than a width of the stationary transition portion 122 so that the transition portion 120 conforms to the interior shape of the stationary transition portion 122 as it follows a radial pitch of the stationary transition portion 122 during retraction and extension in and out of the stationary transition portion 122. To avoid jamming and to maintain a constant gap between the transition portion 120 and the stationary transition portion 122 of each of the respective moveable vanes 108 and stationary vanes 104, a helical motion is employed on the telescoping blocker vane segment 106 that in turn twists the transition portion 120 in and out of the stationary transition portion 122. The helical motion of each moveable vane 108 and its corresponding transition portion 120 is about a helical rotation axis that is the same as the common central axis 115. Moreover, the widths of the transition portion 120 and the stationary transition portion 122 vary linearly with distance from the helical rotation axis. This width variation is to maintain a constant gap between the transition portion 120 and the stationary transition portion 122 thus preventing jamming. As the movement of the transition portion 120 is guided by the motion of the guide rollers 114 (FIG. 2) in following a predetermined path dictated by the guide tracks 110 toward the stationary transition portion 122, the transition portion 120 precisely lines up with an opening 126 of the stationary transition portion 122. Thereafter, the transition portion 120 enters and engages with the stationary transition portion 122. Upon complete insertion of the transition portion 120 into the stationary transition portion 122, the movable vane 108 will be in a retracted position in relation with the stationary vane 104. (See FIG. 4) It is in the retracted position that the LOS is not blocked and, therefore, the hot exhaust fluid can bypass the S-vanes of both the stationary blocker vane segment 102 and the telescoping blocker vane segment 106 in an unimpeded manner as illustrated by the fluid flow arrow 130. This substantially reduces any backpressure in the exhaust system and results in better performance of the gas turbine engine in terms of higher fuel efficiency and more available thrust in the performance mode.

Figure 6:
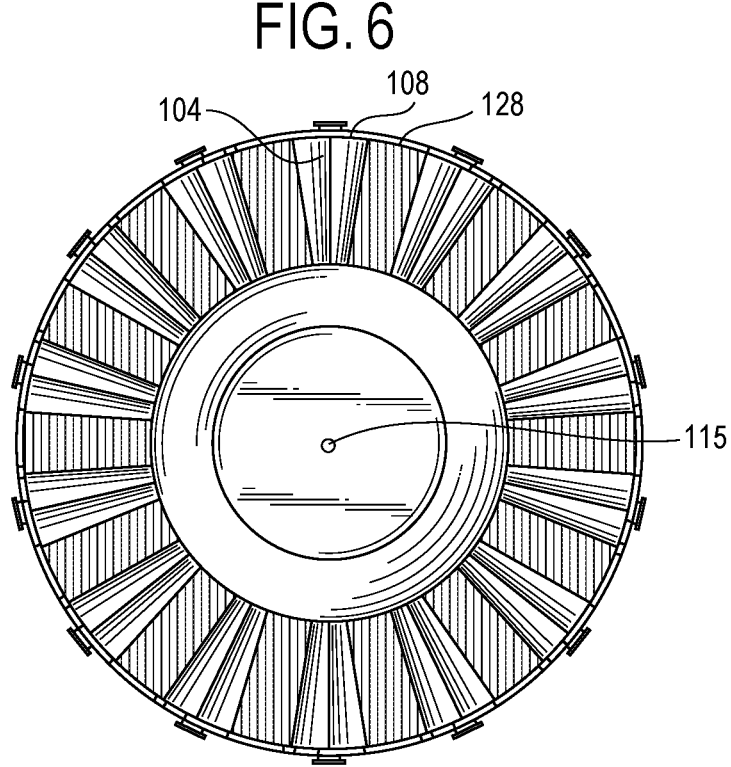
FIG. 6 is an aft-looking forward view of the embodiment of the infrared suppression system of FIG. 4 in a tail-on angle orientation having a substantially unobstructed line-of-sight.
Figure 7:
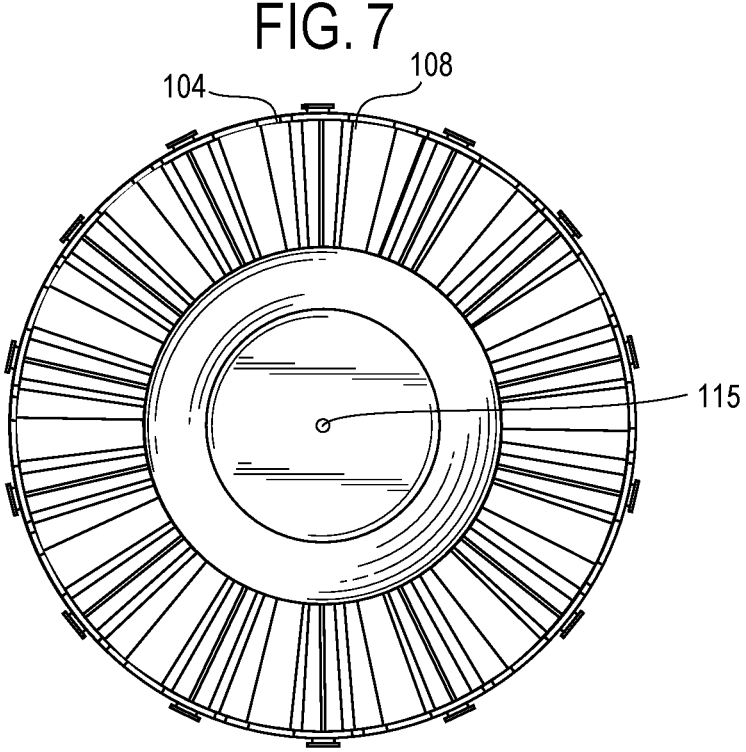
FIG. 7 is an aft-looking forward view of the embodiment of the infrared suppression system of FIG. 3 in a tail-on angle orientation having a substantially blocked line-of-sight.

In both FIG. 6 and FIG. 7, the stationary vanes 104 and moveable vanes 108 are shown in an aft-looking-forward view. Referring to FIG. 6, the vane packs of the stationary blocker vane segment 102 and the telescoping blocker vane segment 106 are shown in the engaged or retracted position. The LOS along the common central axis 115 of the stationary blocker vane segment 102 and the telescoping blocker vane segment 106 is not blocked and the view of a red glow 128 of the exhaust fluid within the turbine portion is unobstructed. The retracted configuration of the vane packs of the telescoping blocker vane segment 106 represents the performance mode of the gas turbine engine. In performance mode, the retracted movable vanes 108 provide lower pressure losses through the vane pack while at the same time provide less blockage of the view of the hot engine parts (e.g. engine turbine).

Referring to FIG. 7, the vane packs of the stationary blocker vane segment 102 and the telescoping blocker vane segment 106 are in the disengaged or extended configuration. The LOS view along the common central axis 115 of the stationary blocker vane segment 102 and the telescoping blocker vane segment 106 is blocked by the stationary vanes 104 and moveable vanes 108 and the view of the red glow 128 of the exhaust fluid within the turbine portion is obstructed. The extended configuration of the vane packs of the telescoping blocker vane segment 106 shown as the moveable vanes 108 represents the IR suppression mode of the gas turbine engine. In IR suppression mode, the extended movable vanes 108 in cooperation with the stationary vanes 104 provide an optimum LOS blockage to hot engine parts (e.g. turbine) in tail-on and tail-off angle orientations. The tail-on angle orientation is when a viewer looks directly in line with the LOS, whereas the tail-off angle orientation is when the viewer is positioned offset from the LOS and is not in line with the LOS direction.

Figure 8A:
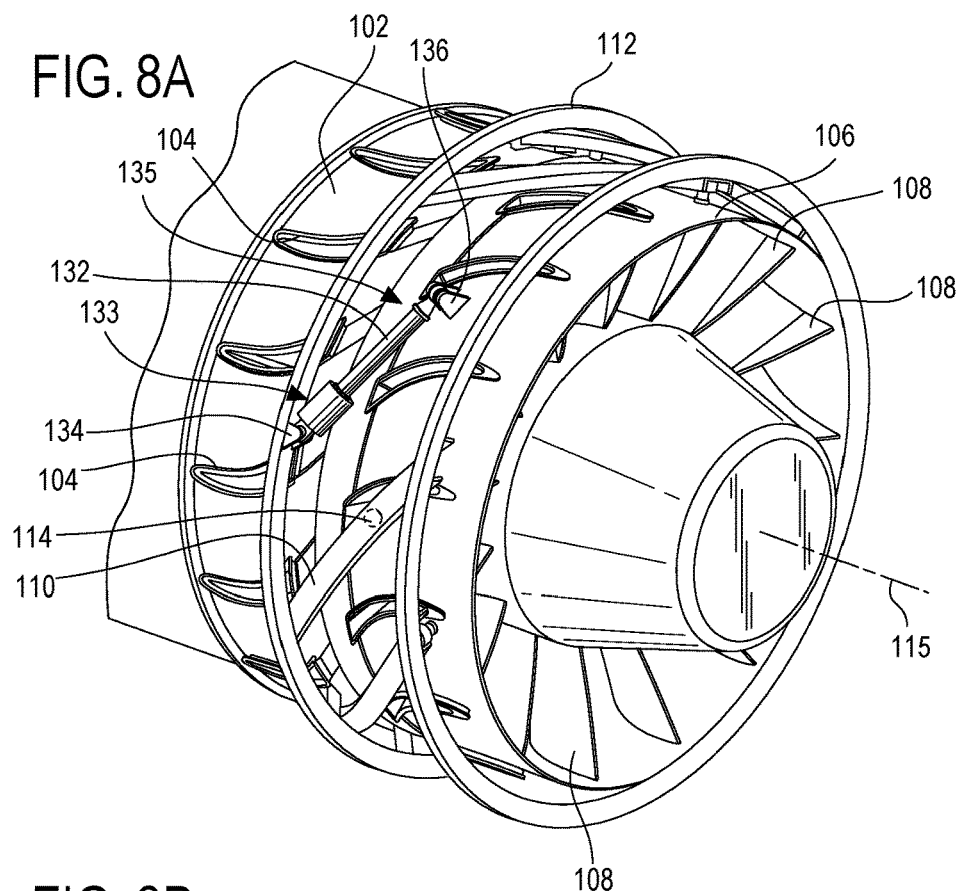
FIG. 8A is an isometric view of another embodiment of the assembled infrared suppression system of FIG. 1 having an actuator in an extended position that is substantially parallel to guide tracks.
Figure 8B:
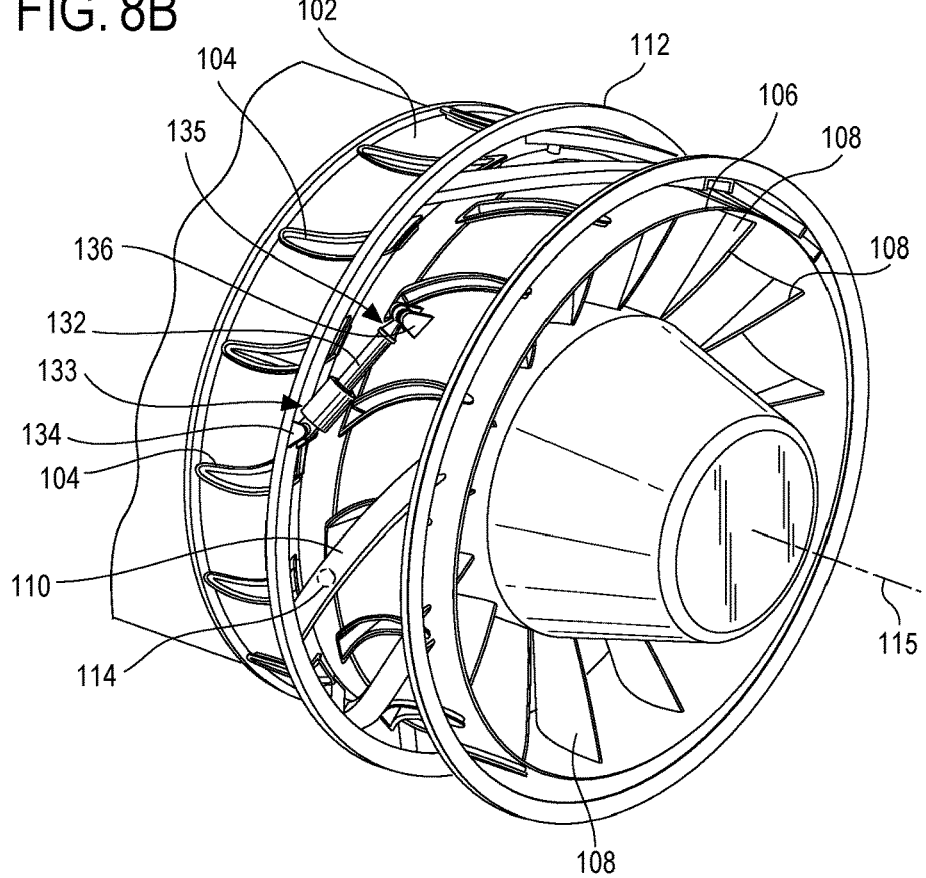
FIG. 8B is an isometric view of the embodiment of the assembled infrared suppression system of FIG. 8A wherein the actuator is in a retracted position.

Referring to FIGS. 8A, 8B, 9A, and 9B, an actuator 132 is shown that provides the reciprocating movement of the telescoping blocker vane segment 106 toward and away from the stationary blocker vane segment 102. As shown in FIG. 8A, the actuator 132 is disposed between the stationary blocker vane segment 102 and the telescoping blocker vane segment 106. The actuator 132 is connected at a first end 133 via a first bracket 134 to the ring-shaped support structure 112, which in turn is connected to the stationary blocker vane segment 102. The actuator 132 is also connected at a second end 135 via a second bracket 136 to the telescoping blocker vane segment 106. In this embodiment, the actuator 132 is disposed and oriented generally in a parallel relationship to the guide tracks 110. Moreover, the actuator 132 is shown in an extended position such that the telescoping blocker vane segment 106 is distal from the stationary blocker vane segment 102. Referring to FIG. 8B, the actuator 132 is in a retracted position which causes the telescoping blocker vane segment 106 to move toward the stationary blocker vane segment 102.

Figure 9A:
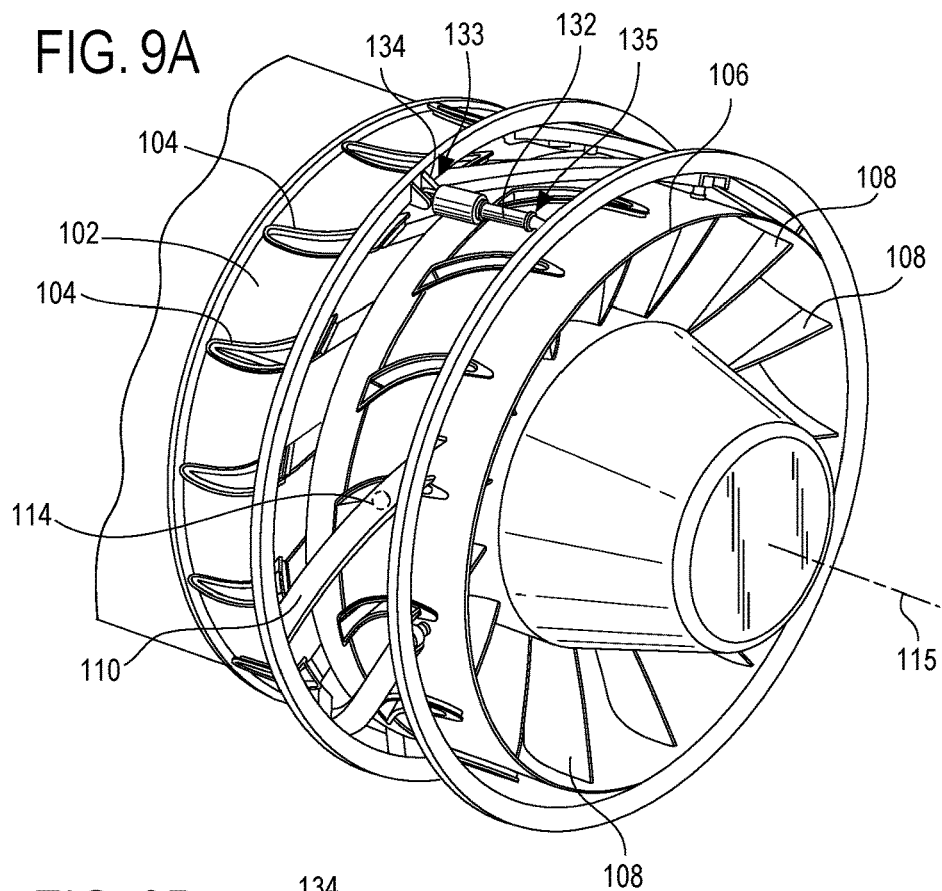
FIG. 9A is an isometric view of yet another embodiment of the assembled infrared suppression system of FIG. 1 having an actuator in an extended position that is substantially in line with a common central axis.
Figure 9B:
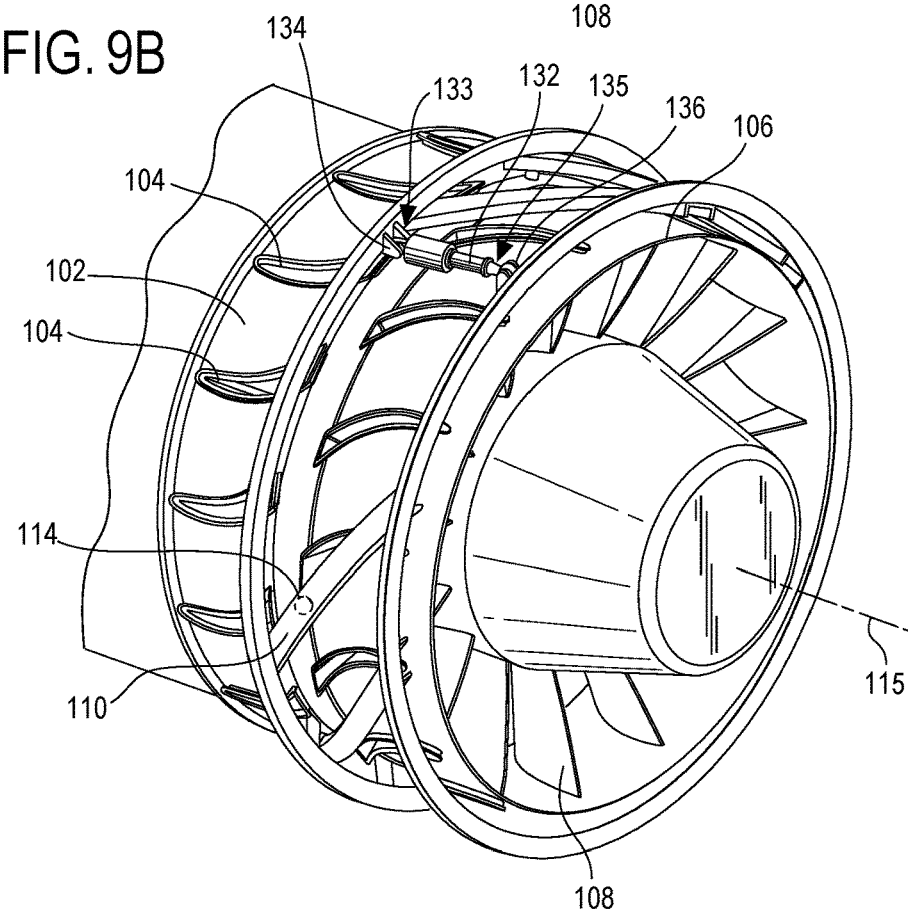
FIG. 9B is an isometric view of the embodiment of the assembled infrared suppression system of FIG. 9A where the actuator is in a retracted position.

Referring to FIG. 9A, in another embodiment, the actuator 132 is shown disposed between the stationary blocker vane segment 102 and the telescoping blocker vane segment 106 and oriented in a substantially axial direction in line with the common central axis 115. The actuator 132 is shown in an extended position resulting in the telescoping blocker vane segment 106 being positioned away and distal from the stationary blocker vane segment 102. FIG. 9B, shows the actuator 132 in the retracted position with the telescoping blocker vane segment 106 also in a retracted position and proximal to the stationary blocker vane segment 102.

The design options for IR suppression system 100 as described herein is not limited to any specific application and may be used, for example, with commercial aircrafts, naval vessels or other applications.

INDUSTRIAL APPLICABILITY

As provided herein, the IR suppression system may be employed in connection with a gas turbine engine, and more specifically, for example, a gas turbine engine intended to be used in a military aircraft. The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:
1. A system for alignment of vanes to suppress infrared detection in a gas turbine engine, comprising:
   a substantially stationary first vane disposed on a first component, the substantially stationary first vane comprising a first transition portion;
   a second vane disposed on a second component and movable relative to the substantially stationary first vane, the second vane comprising a second transition portion; and an actuator disposed between the first component and the second component, wherein the second component is disposed downstream of the first component, and the actuator is configured to move the second component in a helical motion toward the first component to engage the second transition portion into mating arrangement with the first transition portion.

2. The system of claim 1, wherein the first substantially stationary vane and the second vane are S-vanes.

3. The system of claim 1, further comprising:
a guide track connected to the first component; and
a guide roller disposed in the guide track, wherein the guide roller is connected to the second component, the actuator is disposed between the first component and the second component.

4. The system of claim 3, wherein the second component is guided via the guide roller travelling within the guide track in a reciprocating movement caused by the actuator toward and away from the first component.

5. The system of claim 1, wherein the first component is a stationary blocker vane segment and the second component is a telescoping blocker vane segment.

6. A system for alignment of vanes to suppress infrared detection in a gas turbine engine, comprising:
a substantially stationary first vane disposed on a first component, the substantially stationary first vane comprising a first transition portion;
a second vane disposed on a second component and movable relative to the substantially stationary first vane, the second vane comprising a second transition portion; and
an actuator disposed between the first component and the second component, the actuator configured to move the second component toward the first component to engage the second transition portion into mating arrangement with the first transition portion, wherein the second transition portion rotates relative to a common central axis of the first and second components and into the first transition portion.

7. The system of claim 6, wherein the first transition portion has a first radial pitch corresponding to a radial angle of rotation of the second transition portion such that the second transition portion rotates radially into the first transition portion.

8. The system of claim 7, wherein the first transition portion has a first width and the second transition portion has a second width smaller than the first width such that the first and second transition portions can mate.

9. The system of claim 8, wherein the substantially stationary first vane includes a first curved portion that extends away from the first transition portion in a first transverse direction and the second vane includes a second curved portion that extends away from the second transition portion in a second transverse direction opposite the first transverse direction.

10. The system of claim 9, wherein the substantially stationary first vane and the second vane are in an engaged configuration to create a substantially open direct line-of-sight therebetween viewed along the common central axis of the first and second components.

11. The system of claim 9, wherein the first vane and the second vane in a disengaged separated configuration create a substantially blocked direct line-of-sight viewed along the common central axis of the first and second components.

12. An infrared suppression system for a gas turbine engine, comprising:
a first exhaust component having a first plurality of substantially stationary vanes each of the first plurality of substantially stationary vanes comprising a first transition portion;
a second exhaust component having a second plurality of movable vanes, wherein each of the second plurality of movable vanes comprises a second transition portion, and wherein the first exhaust component and the second exhaust component are disposed on a common central axis; and
an actuator disposed between the first exhaust component and the second exhaust component, the actuator configured to cause the second exhaust component to reciprocate toward and away from the first exhaust component such that the second transition portions of each of the second plurality of movable vanes engage into corresponding first transition portions of the first plurality of substantially stationary vanes in a mating arrangement.

13. The infrared suppression system of claim 12, wherein the first plurality of substantially stationary vanes and the second plurality of movable vanes are S-vanes.

14. The infrared suppression system of claim 12, further comprising:
a guide track connected to the first exhaust component; and
a guide roller disposed in the guide track, wherein the guide roller is connected to the second exhaust component.

15. The infrared suppression system of claim 14, wherein the first plurality of substantially stationary vanes and the second plurality of movable vanes are S-vanes, where the second plurality of movable vanes are configured to move in a reciprocating helical motion in relation to the first plurality of substantially stationary vanes such that the second transition portion mates with the first transition portion.

16. The infrared suppression system of claim 15, wherein the first plurality of substantially stationary vanes and the second plurality of movable vanes are in an engaged configuration to create a substantially open direct line-of-sight therebetween viewed along the common central axis of the first and second exhaust components.

17. The infrared suppression system of claim 15, wherein the first plurality of substantially stationary vanes and the second plurality of movable vanes are in a disengaged separated configuration to create a substantially blocked direct line-of-sight viewed along the common central axis of the first and second exhaust components such that an infrared signature of the gas turbine engine is suppressed.

* * * * *